US010261335B2

(12) United States Patent
Terajima

(10) Patent No.: US 10,261,335 B2
(45) Date of Patent: Apr. 16, 2019

(54) LENS DRIVING DEVICE WITH SHAKING CORRECTION FUNCTION HAVING MAGNET YOKES WITH ENDS SEPARATED FROM AND OPPOSITE TO MAGNETIC FORCE DETECTION MECHANISMS

(71) Applicants: Huizhou Dayawan Ever Bright Electronic Industry Co., Ltd., Huizhou (CN); JSS Optical Technology Co., Ltd., Hong Kong (CN); Huizhou Daya Bay Jss Optical Technology.Co., Ltd., Huizhou (CN)

(72) Inventor: Kokichi Terajima, Tokyo (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (HK); HUIZHOU DAYA BAY JSS OPTICAL TECHNOLOGY CO., LTD., Huizhou (CN)

( * ) Notice: Subject to any disclaimer, the term of this patent is extended or adjusted under 35 U.S.C. 154(b) by 348 days.

(21) Appl. No.: 15/294,955

(22) Filed: Oct. 17, 2016

(65) Prior Publication Data

US 2017/0115503 A1 Apr. 27, 2017

(30) Foreign Application Priority Data

Oct. 27, 2015 (JP) .................................. 2015-210571

(51) Int. Cl.
*G02B 27/64* (2006.01)
*G03B 3/10* (2006.01)
(Continued)

(52) U.S. Cl.
CPC ............. *G02B 27/646* (2013.01); *G03B 3/10* (2013.01); *G03B 5/00* (2013.01);
(Continued)

(58) Field of Classification Search
CPC . G02B 7/023; G02B 7/09; G02B 7/10; G02B 7/102; G02B 23/16; G02B 27/64;
(Continued)

(56) References Cited

U.S. PATENT DOCUMENTS

2005/0195286 A1* 9/2005 Uenaka ..................... G03B 5/02
348/208.99
2013/0016427 A1 1/2013 Sugawara
(Continued)

*Primary Examiner* — Stephone B Allen
*Assistant Examiner* — Ryan S Dunning
(74) *Attorney, Agent, or Firm* — Hemisphere Law, PLLC; Zhigang Ma

(57) ABSTRACT

The present invention provides a lens driving device with a shaking correction function, which does not need magnets for position detection and also cannot reduce driving force during swinging. The lens driving device is configured as follows: a square frame shaped magnet support, each magnet is a cylinder in an isosceles trapezoid shape and is mounted in a corresponding corner in a manner that its long base faces the center of the magnet support, one or two X-direction magnetic force detection mechanisms have detection sensitivity for X-axis direction components of magnetic induction intensity and are mounted on the outer side of the corresponding magnets in a Y-axis direction, and one or two Y-direction magnetic force detection mechanisms have detection sensitivity for Y-axis direction components of magnetic induction intensity and are mounted on the outer side of the corresponding magnets in an X-axis direction.

18 Claims, 6 Drawing Sheets

(51) Int. Cl.
*G03B 5/00* (2006.01)
*H04N 5/232* (2006.01)
*H04N 5/225* (2006.01)

(52) U.S. Cl.
CPC ............... *G03B 2205/0007* (2013.01); *G03B 2205/0069* (2013.01); *H04N 5/2253* (2013.01); *H04N 5/23287* (2013.01)

(58) Field of Classification Search
CPC .......... G02B 27/646; G03B 3/10; G03B 5/00; G03B 2205/0007; G03B 2205/0015; G03B 2205/0023; G03B 2205/0038; G03B 2205/0069; G03B 2205/0084; H04N 5/2253; H04N 5/23264; H04N 5/2328; H04N 5/23287
USPC ................ 348/208.99, 208.4, 208.7, 208.11; 359/554, 557, 819, 822, 823, 824; 396/52, 55
See application file for complete search history.

(56) References Cited

U.S. PATENT DOCUMENTS

| | | | |
|---|---|---|---|
| 2013/0222664 A1* | 8/2013 | Takahashi | H04N 5/23287 348/333.01 |
| 2014/0177056 A1 | 6/2014 | Hayashi et al. | |
| 2015/0022891 A1* | 1/2015 | Hu | G02B 7/08 359/557 |
| 2015/0226978 A1 | 8/2015 | Sugawara | |
| 2016/0231528 A1* | 8/2016 | Wong | G01D 5/142 |

\* cited by examiner

LENS DRIVING DEVICE WITH SHAKING CORRECTION FUNCTION HAVING MAGNET YOKES WITH ENDS SEPARATED FROM AND OPPOSITE TO MAGNETIC FORCE DETECTION MECHANISMS

BACKGROUND OF THE INVENTION

1. Field of the Invention

The present invention relates to lens driving devices, and particularly to a lens driving device with a shaking correction function used for driving a camera of a mobile phone to carry out auto focus and correcting shaking occurring on the camera.

2. Description of Related Art

Lens driving devices with a shaking correction function use an auto focus function to carry out auto focus, and use a shaking correction function to swing the lens in directions forming a right angle with an optical axis of the lens correspondingly when a shake is occurred in shooting so as to inhibit an image formed on an image sensor from being fuzzy. For example, Japanese patent application with an application publication number of JP2013-24938A and a publication date of Feb. 4, 2013 (by taking the application as the priority, US patent publication Nos. US20130016427A1 and US20150226978A1 with publication dates of Jan. 17, 2013 and Aug. 13, 2015) provides a lens driving device 50 with a shaking correction function. A focusing unit is suspended and supported to swing in directions forming the right angle with the optical axis by using linear spring members extending along the direction of the optical axis, and the focusing unit swings by operating a hand shake correcting unit so as to inhibit the image from being fuzzy.

As shown in FIG. 5A to FIG. 5C, the lens driving device 50 with the shaking correction function is illustrated. Particularly, FIG. 5A is a perspective view of the lens driving device 50 with the shaking correction function, FIG. 5B is an explosive view of the lens driving device 50 with the shaking correction function, and FIG. 5C is a perspective view of main parts of the lens driving device 50 with the shaking correction function. Hereon, a direction of an optical axis of the unshown lens is set to be a Z (Z-axis) direction, and two directions which form right angles with the Z axis and vertical to each other are set to be a P (P axis) direction and a Q (Q axis) direction respectively.

As shown in FIG. 5A, the lens driving device 50 with the shaking correction function is accommodated in a shielding box body 65, and is integrally formed in a cuboid shape. A circular ring-shaped opening is formed in the central part of the screening box body 65 in the Z-axis direction, and an unshown lens is maintained by a lens support 53 in the central part.

The lens driving device 50 is composed of a focusing unit 51 and a hand shake correcting unit 52.

The focusing unit 51 is provided with a lens support 53, a focus coil 54A, magnets 55A and a magnet support 56, a suspension supporting mechanism composed of plate-like spring members 57 and a spacer 58. The hand shake correcting unit 52 is provided with correction coils 59A, a wiring substrate 62A, a connecting substrate 62B, a swing supporting mechanism 60 composed of the linear spring members, Hall elements 61 for position detection and a base station 63.

The lens support 53 is a cylindrical member with an opening in the Z-axis direction, and is used for maintaining the lens on the inner peripheral side. The focus coil 54A is wound into a square ring shape along an outer diameter side of the lens support 53. The magnetic pole faces of the total four magnets 55a form a cuboid shape, face a P-axis direction and a Q-axis direction, and are arranged on an outer diameter side of the focus coil 54A at 90-degree intervals around an axis parallel to the Z axis. The magnets 55A are separated from and arranged opposite to the focus coil 54A at intervals along the P-axis direction and the Q-axis direction. Moreover, the magnets 55A are maintained on the frame edge part 56A of the square frame-shaped magnet support 56.

The suspension supporting mechanism 57 is composed of a front side spring member 57A and a rear side spring member 57B. The inner peripheral parts of the front side spring member 57A and the rear side spring member 57B are connected with the +Z side end surface and the −Z side end surface of the lens support 53 respectively. Moreover, the outer peripheral part of the front side spring member 57 is connected with the +Z side end surface of the magnet support 56. The outer peripheral part of the rear side spring member 57B, together with the spacer 58 on the outer peripheral part, is connected to the −Z side end surface of the magnet support 56. As a result, the front side spring member 57A and the rear side spring member 57 B are used for suspending and supporting the lens support 53 to move in the Z-axis direction.

When the focus coil 54A of the focusing unit 51 is electrified, Lorentz force in the Z-axis direction is generated, and the lens support 53 moves in the Z-axis direction based on the Lorentz force.

The connecting substrate 62B connected with an external control circuit is mounted on the +Z side surface of the plate-like base station 63 with an opening in the central part in the Z-axis direction. The wiring substrate 62A is mounted on the +Z side surface of the connecting substrate 62B. An electric power supply circuit is formed on the wiring substrate 62A, and the upper part of the electric power supply circuit is connected with the correction coils 59A.

The correction coils 59A include P side correction coils 59AP which are wound around axises parallel to the Z axis and are assembled on the −P side and the +P side of the wiring substrate 62A respectively and Q side correction coils 59AQ which are wound around axises parallel to the Z axis and are assembled on the −Q side and the +Q side of the wiring substrate 62A respectively. The correction coils 59A are separated from and arranged opposite to the −Z side surfaces of the magnets at intervals along the Z-axis direction.

The swing supporting mechanism 60 is composed of four linear spring members extending along the Z axis direction. The front side end part 60a of each spring member is connected with the front side spring member 57A, and the rear side end part 60b of each spring member is connected with the base station 63. The swing supporting mechanism 60 is used for supporting the focusing unit 51 to swing in the P-axis direction and the Q-axis direction.

As shown in FIG. 5C, the Hall elements 61 for position detection are composed of a Hall element 61P on the side of the P axis and a Hall element 61Q on the side of the Q axis. The Hall element 61P assembled on the −Z side of the correction coils 59AP is fixed on the base station 63, and is separated from and arranged opposite to the −Z side surfaces of the magnets 55A at intervals via the P side correction coils 59AP along the Z-axis direction. The Hall element 61Q assembled on the −Z side of the correction coils 59AQ is fixed on the base station 63, and is separated from and arranged opposite to the −Z side surfaces of the magnets 55A at intervals via the Q side correction coils 59AQ along the Z-axis direction.

The Hall elements 61P, 61Q are all used for detecting magnetic induction intensity in the Z-axis direction generated by the oppositely arranged magnets 55A. As a result, the change of magnetic induction intensity generated along with the swing of the oppositely arranged magnets 55A in the P-axis direction is detected by the Hall element 61P. Moreover, the change of magnetic induction intensity generated along with the swing of the oppositely arranged magnets 55A in the Q-axis direction is detected by the Hall element 61Q. Thus, the Hall element 61P can obtain the swinging position of the magnet support 56 along the P-axis direction, and the Hall element 61Q can obtain the swinging position of the magnet support 56 along the Q-axis direction.

And then, when the P side correction coils 59AP of the hand shake correcting unit 52 are electrified, the P side correction coils 59AP generate the Lorentz force in the P-axis direction, and the magnets 55A generate counteracting force, so that the focusing unit 51 swings in the P-axis direction. Moreover, when the Q side correction coils 59AQ are electrified, the Q side correction coils 59AQ generate the Lorentz force in the Q-axis direction, and the magnets 55A generate counteracting force, so that the focusing unit 51 swings in the Q-axis direction.

As a result, when hand shaking is generated during shooting, the P side correction coils 59AP and the Q side correction coils 59AQ are electrified, and the swing amplitude is monitored by the Hall element 61P and the Hall element 61Q, so that hand shake correction is implemented accordingly.

However, as shown in FIG. 5C, the magnets 55A with rectangular cross sections observed from the Z-axis direction are assembled on the outer side of four sides of the square ring-shaped focus coil 54A, namely on the outer side in the P-axis direction and the Q-axis direction, so that the width in the P-axis direction and the width in the Q-axis direction of the lens driving device 50 are increased, and the lens driving device 50 with the shaking correction function is large-sized.

Therefore, as shown in FIG. 6A, the Japanese patent application with the application publication number of JP2014-126668A and the publication date of Jul. 7, 2014 (by taking the application as the priority, US patent application publication No. US2014177056A1 with the publication date of Jun. 26, 2014) discloses another lens driving device with a shaking correction function. FIG. 6A illustrate perspective views of main parts of the lens driving device with the shaking correction function. In the lens driving device, the magnets 55B with isosceles trapezoid-shaped cross sections observed from the Z-axis direction are maintained at the corners of an unshown quadrate magnet support, namely at the corner positions with long distances (in the X-axis direction and the Y-axis direction) so as to avoid an increase of the width in the P-axis direction and the increase of the width in the Q-axis direction. Moreover, in FIG. 6A and FIG. 6B, the X-axis direction is the direction of rotating by 45 degrees around the Z axis from the P-axis direction to the +Q-axis direction, and the Y-axis direction is the direction of rotating by 45 degrees around the Z axis from the Q-axis direction to the −P-axis direction.

The focus coil 54B is wound around the axis parallel to the Z axis along the outer surface of the unshown lens support, and is octagonal ring-shaped. The magnetic pole faces of the magnets 55B face the X-axis direction and the Y-axis direction, and the total four magnets 55B are assembled on the outer diameter side of the focus coil 54B diagonally at 90-degree intervals around the axis parallel to the Z axis. And then, the magnets 55B are separated from and arranged opposite to the focus coil 54B at intervals along the X-axis direction and the Y-axis direction, and are maintained at four corners of the unshown square frame-shaped magnet support.

When the focus coil 54B is electrified, the focus coil 54B generates Lorentz force in the Z-axis direction, so that the unshown lens support moves in the Z-axis direction.

The correction coils 59B include X side correction coils 59BX assembled on the −X side and the +X side and wound around the Z-axis direction respectively, and Y side correction coils 59BY assembled on the −Y side and the +Y side and wound around the Z-axis direction respectively. The correction coils 59B are separated from and arranged opposite to the −Z side surfaces of the magnets 55B at intervals along the Z-axis direction.

When the X side correction coils 59BX are electrified, the X side correction coils 59BX generate the Lorentz force in the X-axis direction, and the magnets 55B generate counteracting force, so that the unshown focusing unit 51 swings in the X-axis direction. Moreover, when the Y side correction coils 59BY are electrified, the Y side correction coils 59BY generate the Lorentz force in the Y-axis direction, and the magnets 55B generate counteracting force, so that the unshown focusing unit 51 swings in the Y-axis direction.

Hereon, magnet 64PP used for position detection and magnetized along the X-axis direction is assembled on the outer side in the +P-axis direction of the focus coil 54B, and the magnet 64PP is fixed on the unshown magnet support. Moreover, the magnet 64PM used for position detection and magnetized in the Y-axis direction is assembled on the outer side in the −P-axis direction of the focus coil 54B, and is fixed on the unshown magnet support.

The Hall elements 61 for position detection are composed of a Hall element 61PP on the +P side and a Hall element 61PM on the −P side. The Hall element 61PP is assembled on the −Z side of the magnet 64PP, and is fixed on the unshown base station. The Hall element 61PM is assembled on the −Z side of the magnet 64PM, and is fixed on the unshown base station.

Thus, the Hall element 61PP is separated from and arranged opposite to the magnet 64PP at an interval along the Z direction, and the Hall element 61PM is separated from and arranged opposite to the magnet 64PM at an interval along the Z direction. Moreover, the Hall element 61PP can detect the components of the Z-axis direction of magnetic induction intensity generated by the magnet 64PP. The Hall element 61PP can detect the components of the Z-axis direction of magnetic induction intensity generated by the magnet 64PM.

And then, the Hall element 61PP detects the change of magnetic induction intensity generated along with the swing of the magnet 64PP in the X-axis direction. The Hall element 61PM detects the change of magnetic induction intensity generated along with the swing of the magnet 64PM in the Y-axis direction.

Thus, the Hall element 61PP can obtain the swinging position of the magnet support along the X-axis direction, and the Hall element 61Q can obtain the swinging position of the magnet support along the Y-axis direction.

As a result, when hand shaking is generated in shooting, the X side correction coils 58BX and the Y side correction coils 59BY are electrified, and the swing amplitude is monitored by the Hall element 61PP and the Hall element 61PM, so that hand shake correction is implemented.

Thus, in the Japanese patent application with the publication number of JP2014-126668, the magnets 55B are configured at opposite corners so as to prevent the width dimensions from being increased, and large size can be avoided. However, in the other aspect, the magnets 64PP, 64PM for position detection need to be mounted, thus the number of components of the lens driving device is increased, the structure becomes complicated and the product cost becomes higher.

In order to solve the above problems, the lens driving device with the shaking correction function as shown in FIG. 6B is provided, the magnets 64PP, 64PM for position detection are not used, and the Hall elements 61X, 61Y are arranged at the back of the magnets 55B in the Z-axis direction and are used in position detection.

Under the condition, the Hall element 61X for position detection is assembled on the −Z side of the correction coils 59BX and is fixed on the unshown base station, and is separated from and arranged opposite to the −Z side surface of the magnets 55B at intervals across the correction coils 59BX along the Z-axis direction. The Hall element 61Y for position detection is assembled on the −Z side of the correction coils 59BY and is fixed on the unshown base station, and is separated from and arranged opposite to the −Z side surface of the magnets 55B at intervals across the correction coils 59BY along the Z-axis direction.

The Hall elements 61X, 61Y are all used for detecting the components of Z-axis direction of magnetic induction intensity generated by the oppositely arranged magnets 55B. Particularly, the Hall element 61X is used for detecting the change of magnetic induction intensity generated along with the swing of the oppositely arranged magnets 55B in the X-axis direction. The Hall element 61X is used for detecting the change of magnetic induction intensity generated along with the swing of the oppositely arranged magnets 55B in the Y-axis direction. Thus, the Hall element 61X can obtain the swinging position of the magnet support along the X-axis direction, and the Hall element 61Y can obtain the swinging position of the magnet support along the Y-axis direction.

Hereon, the Hall elements 61X, 61Y assembled at the back of the Z-axis direction of the correction coils 59B may miss magnetic noise generated along with the electrification of the correction coils 59B so as to generate error position detection signals. In order to inhibit the missing of the magnetic noise, the correction coils 59BX are clamped between the magnets 55B and the Hall elements 61X and the correction coils 59BY are clamped between the magnets 55B and the Hall elements 61Y. The correction coils 59B do not face the middle parts of the Hall elements 61X and the Hall elements 61Y, but each correction coil 58B that corresponding to one of the Hall elements 61X and the Hall elements 61Y is cut into two winding sheets. However, when the correction coils 59B are cut into the winding sheets, the cross amount of magnetic induction lines generated by the magnets 55B and the cut correction coils 59BX, 59BY is reduced, so that the driving force (swinging force) during swinging is reduced.

BRIEF SUMMARY OF THE INVENTION

The present invention aims to provide a lens driving device with a shaking correction function which cannot cause large size of the device, does not need magnets for position detection and also cannot cause the reduction of driving force during swinging.

The lens driving device with a shaking correction function is configured for driving a lens or a lens assembly. An optical axis of the lens or the lens assembly is taken as a Z-axis and two mutually orthogonal axes which are orthogonal with the Z-axis are taken as an X-axis and a Y-axis respectively. The lens driving device includes a focusing unit and a hand shake correcting unit. The focusing unit includes a lens support configured for maintaining the lens or the lens assembly, a focus coil wound around the Z-axis direction and sleeved on the lens support, a magnet support, a plurality of magnets received in the magnet support and configured opposite to the focus coil with an interval in a radial direction of the lens or the lens assembly, and a suspension supporting mechanism connected between the lens support and the magnet support and configured for supporting the lens support to move in the Z-axis direction. The a hand shake correcting unit includes a base station, a plurality of magnetic force detection mechanisms mounted on the base station, a plurality of correction coils each of which is wound around an axis parallel to a Z axis and is configured opposite to a corresponding one of the plurality of magnets with an interval along the Z-axis direction, and a swing supporting mechanism connected between the base station and the focusing unit and configured for supporting the focusing unit to swing in directions orthogonal with the Z axis. When being observed in the Z-axis direction, each magnet is an isosceles trapezoid with its long base facing a center of the magnet support, the magnet support is substantially a square frame body, four corners of the frame body are positioned in the X-axis direction and the Y-axis direction respectively, and the magnets are mounted at the four corners of the magnet support. The plurality of magnetic force detection mechanisms include one or two X-direction magnetic force detection mechanisms and one or two Y-direction magnetic force detection mechanisms. The one or two X-direction magnetic force detection mechanisms has detection sensitivity for X-axis direction components of magnetic induction intensity and are mounted in the Y-axis direction, and each X-direction magnetic force detection mechanism is configured on an outer side of a corresponding one of the plurality of magnets in the radial direction of the lens or the lens assembly. The one or two Y-direction magnetic force detection mechanisms has detection sensitivity for Y-axis direction components of magnetic induction intensity and are mounted in the X-axis direction. Each Y-direction magnetic force detection mechanism is configured on an outer side of a corresponding one of the plurality of magnets in a radial direction of the lens or the lens assembly.

Thus, the magnets for position detection do not need to be mounted additionally, and the magnetic force detection mechanisms can also detect the positions of the magnets mounted in the X-axis direction and the positions of the magnets mounted in the Y-axis direction at high precision. Therefore, the present invention can provide the small and low-cost lens driving device with the shaking correction function.

As an embodiment, the magnet support is further provided with a first pair of magnet yokes whose one ends are separated from and arranged opposite to the X-direction magnetic force detection mechanisms at intervals on two sides in the X-axis direction of the X-direction magnetic force detection mechanisms, and a second pair of magnet yokes whose one ends are separated from and arranged opposite to the Y-direction magnetic force detection mechanisms at intervals on two sides in the Y-axis direction of the Y-direction magnetic force detection mechanisms.

Thus, the detection sensitivity of the magnetic force detection mechanisms can be improved, so that the positions of the magnets in the X-axis direction and the Y-axis direction can be detected at high precision.

As an embodiment, there are two X-direction magnetic force detection mechanisms symmetrically mounted in the Y-axis direction and two Y-direction magnetic force detection mechanisms symmetrically mounted in the X-axis direction. The lens driving device further includes a first detection circuit connected to output ends of the two X-direction magnetic force detection mechanisms, and a second detection circuit connected to output ends of the two Y-direction magnetic force detection mechanisms. Each of the first and the second detection circuits includes a differential processing circuit used for carrying out differential processing on output signals received from the output ends.

Thus, the noise generated in the detection output of the magnetic force detection mechanisms when the focusing unit rotates around the Z axis can be inhibited, so that the positions of the magnets in the X-axis direction and the Y-axis direction can be detected at higher precision.

As an embodiment, the swing supporting mechanism includes a plurality of linear spring members extending along the Z-axis direction. Every two adjacent magnets corresponds to one of the plurality of linear spring members, and the one of the plurality of linear spring members is configured between the two adjacent magnets. One end of each linear spring member is connected with the hand shake correcting unit, and the other end is connected with the focusing unit.

As a result, the possibility of mutual interference between the swing supporting mechanism and other forming members can be reduced, the assembling is easier, the focusing unit can straightly swing in the X-axis direction and the Y-axis direction, and the magnetic induction intensity can be stably detected by the magnetic force detection mechanisms.

As another embodiment, the swing supporting mechanism includes a plurality of rotatable rotating members. Every two adjacent magnets correspond to one of the plurality of rotating members, and the one of the plurality of rotating members is configured between the two adjacent magnets. The plurality of rotatable rotating members is clamped between the focusing unit and the hand shake correcting unit along the Z-axis direction.

As a result, the possibility of mutual interference between the swing supporting mechanism and other forming members can be reduced, the assembling is easier, the focusing unit can straightly swing in the X-axis direction and the Y-axis direction, and the magnetic induction intensity can be stably detected by the magnetic force detection mechanisms.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

Figure 5A:
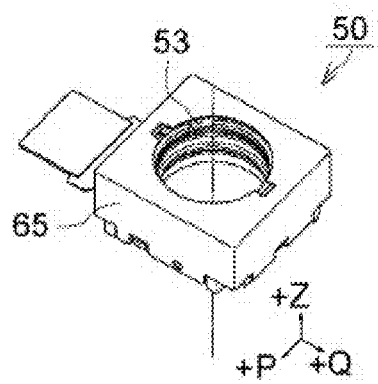
Figure 5B:
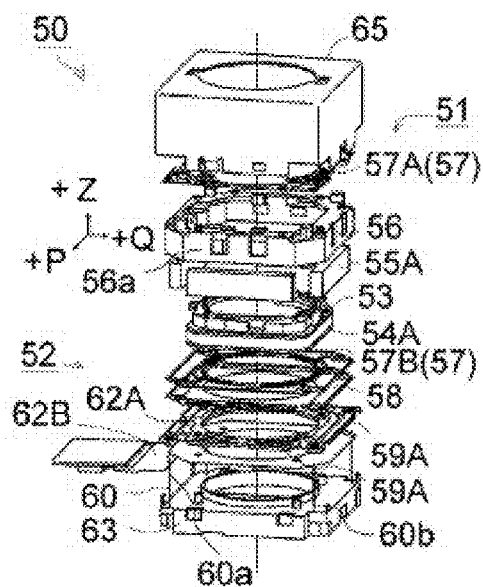
Figure 5C:
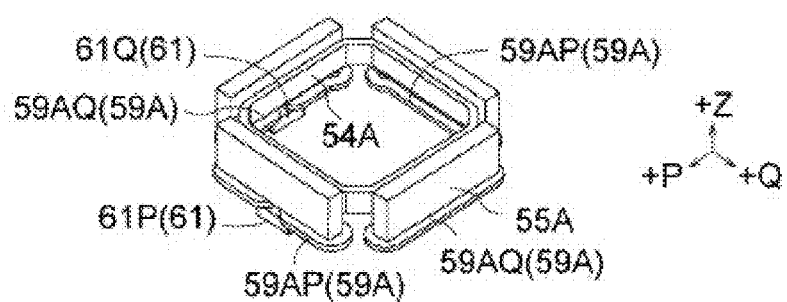

FIG. 5A is a perspective view of an existing lens driving device with the shaking correction function. FIG. 5B is an exploded view of the existing lens driving device in FIG. 5A. FIG. 5C parties a perspective view of main parts of the existing lens driving device in FIG. 5A.

Figure 6A:
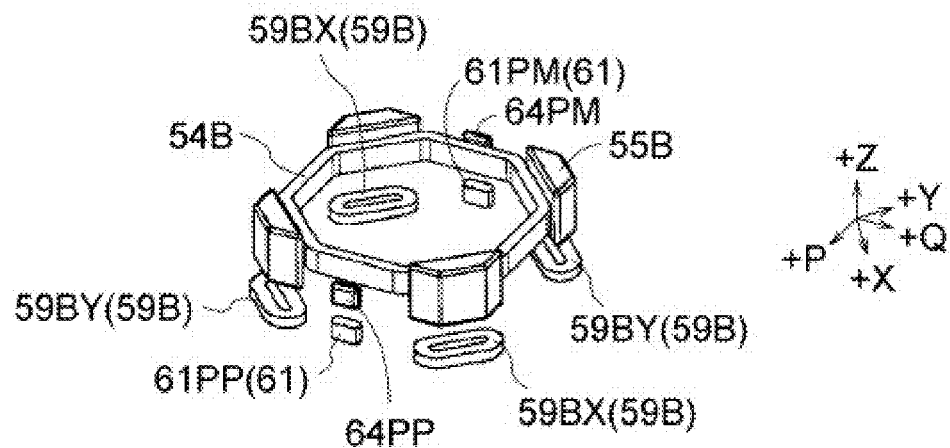

FIG. 6A is a perspective view illustrating main parts of another existing lens driving device with shaking correction function.

Figure 6B:
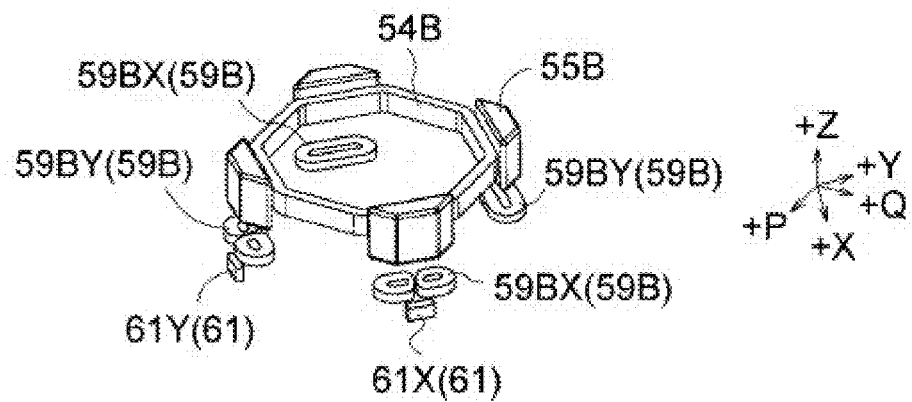

FIG. 6B is a perspective view illustrating main parts of further another existing lens driving device with shaking correction function.

DETAILED DESCRIPTION OF THE INVENTION

The invention will now be described in detail through several embodiments with reference to the accompanying drawings.

Figure 1A:
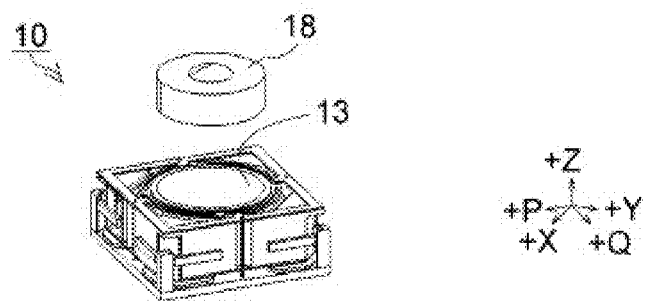
FIG. 1A is a perspective view and FIG. 1B is an exploded view of a lens driving device with shaking correction function in accordance with a first embodiment of the present invention.
Figure 1B:
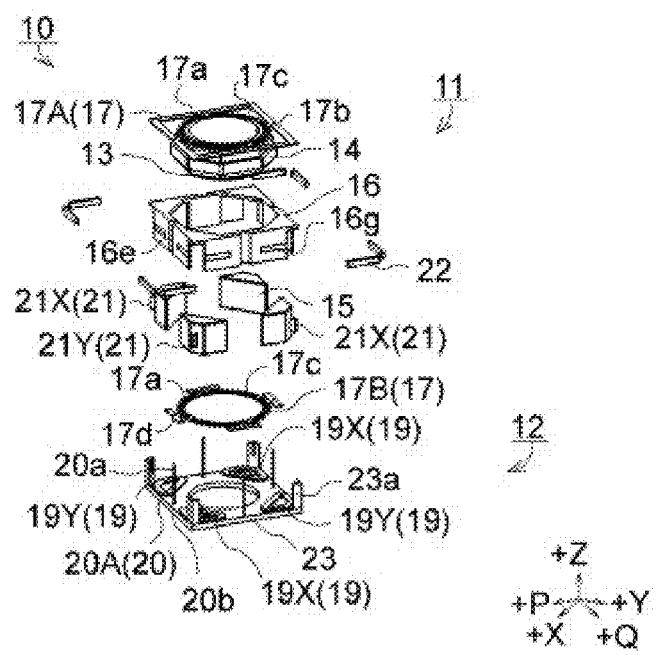
Figure 2A:
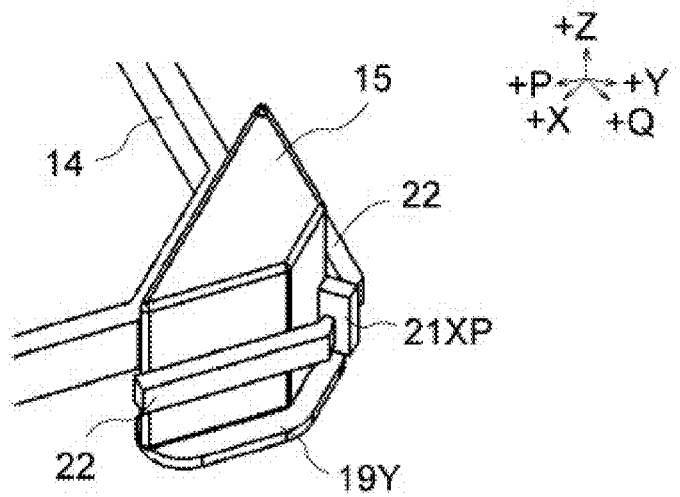
FIG. 2A is a perspective view of a main part of the lens driving device in accordance with a first embodiment of the present invention.
Figure 2B:
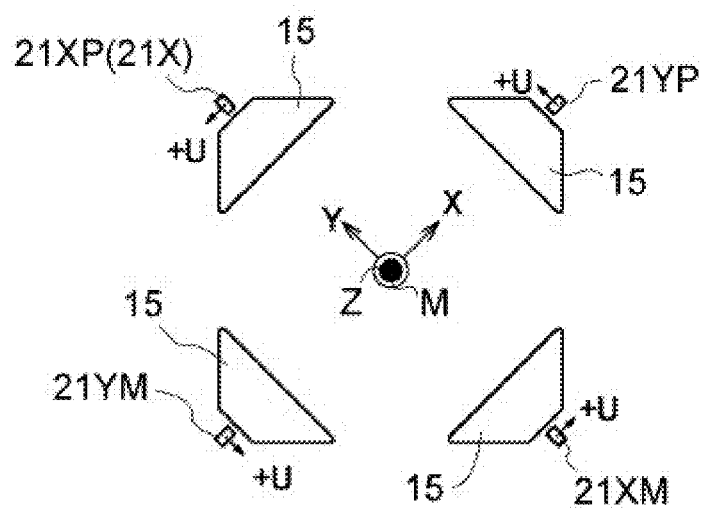
FIG. 2B is a top plane view of the main parts of the lens driving device of the first embodiment of the present invention.

FIG. 1A is a perspective view illustrating a lens driving device 10 with a shaking correction function in a first embodiment, and FIG. 1B is an explosive view illustrating the lens driving device 10. Moreover, FIG. 2A is a perspective view illustrating a main part of the lens driving device 10, and FIG. 2B is a top plane view illustrating main parts of the lens driving device 10. Below, a direction of the optical axis of a lens 18 is taken as a Z (Z-axis) direction, a side of an object to be shot is taken as the front (+Z side) of the Z-axis direction, and two mutually perpendicular directions both forming the right angle with the Z axis are respectively taken as the X (X-axis) direction and the Y (Y-axis) direction.

As shown in FIG. 1A, the lens driving device 10 is substantially of a cuboid shape. In the lens driving device 10, the lens 18 is maintained by a lens support 13 with a circular opening in the Z-axis direction in the central part.

Please also refer to FIG. 1B, the lens driving device 10 includes a focusing unit 11 and a hand shake correcting unit 12.

The focusing unit 11 includes the lens support 13, a focus coil 14, magnets 15, a magnet support 16 and a suspension supporting mechanism 17 composed of platelike spring members. The hand shake correcting unit 12 includes correction coils 19, a swing supporting mechanism 20 composed of linear spring members 20A, magnetic force detection mechanism 21, magnet yokes 22 and a base station 23.

The lens support 13 is an octagonal cylindrical member with an opening along the Z-axis direction in the central part, and the lens 18 is maintained on the inner peripheral side of the lens support 13. The focus coil 14 is wound into an octagonal ring shape along an outer peripheral surface of the lens support 13.

The magnet support 16 is a member formed into a square frame body with an opening in the Z-axis direction as shown in FIG. 1B. Moreover, as shown in FIG. 1B and FIG. 2B, the X-axis direction and the Y-axis direction respectively coincide with the two diagonals (passing through corners of the magnet support 16 when viewing from the +Z side, or in other words, the X-axis direction and the Y-axis direction are also the opposite angle directions) of the magnet support 16, the center axis M penetrating through the center of the magnet support 16 is the same as the optical axis (Z axis) of the lens 18.

When the magnets 15 are observed in the Z-axis direction, the cross section of each magnet 15 is in an isosceles trapezoid shape. Each magnet 15 is magnetized between its short base and the long base (the parallel sides), in other words, a magnetization direction of each magnet is perpendicular to or passing through the short base and the long base. The magnetic pole faces on the sides of the long bases of the magnets 15 face the center of the magnet support 16, and four magnets 15 are arranged on the outer diameter side of the focus coil 14 at opposite angles at 90-degree intervals around the axis parallel to the Z axis. And then, the magnets 15 are separated from and arranged opposite to the focus coil 14 at intervals along the X-axis direction and the Y-axis direction. Thus, the magnets 15 are maintained at four corners in the diagonals of the magnet support 16 when being observed in the Z-axis direction.

The suspension supporting mechanism 17 includes a front side spring member 17A and a rear side spring member 17B. Circular ring-shaped inner side maintaining parts 17a of the front side spring member 17A and the rear side spring member 17B are connected with the +Z side end surface and the −Z side end surface of the lens support 13 respectively. Moreover, the square ring-shaped outer side maintaining part 17b of the front side spring member 17A is connected with the +Z side end surface of the magnet support 16. The four oblong outer side maintaining parts 17d of the rear side spring member 17B are connected with the −Z side end surface of the magnet support 16. The wrist parts 17c of the front side spring member 17A are taken as springs for connecting the inner side maintaining part 17a with the outer side maintaining part 17b to take effect. The wrist parts 17c of the rear side spring member 17B are taken as springs for connecting the inner side maintaining part 17a with the outer side maintaining parts 17b to take effect. Thus, the suspension supporting mechanism 17 is used for supporting the lens support 13 in a suspension manner to be moved in the Z-axis direction.

When the focus coil 14 of the focusing unit 11 formed as mentioned above is electrified, the focus coil 14 generates Lorentz force in the Z-axis direction, and the lens support 13 moves in the Z-axis direction.

Then, elements/members of the hand shake correcting unit 12 are described.

The base station 23 includes a square plate defining an opening in the Z-axis direction in the central part, and the square plate takes the X-axis direction and the Y-axis direction as its diagonal directions, and four sensor support parts 23a extend upwardly along the Z-axis direction from the four corners of the square plate. Each sensor support part 23a corresponds to one of the magnets 15, and is arranged on the outer side of the corresponding magnets in the X-axis direction or in Y-axis direction so as to maintain a corresponding one of the magnetic force detection mechanisms 21. The correction coils 19 are mounted on the +Z side surface of the base station 23 positioned on the −Z side of the magnets 15.

Each correction coil 19 is wound around an axis parallel to the Z axis, and is separated from and arranged opposite to the −Z side surface of a corresponding one of the magnets 15 at an interval along the Z-axis direction. The correction coil 19 includes two X side correction coil 19X assembled on the −X side and the +X side respectively and two Y side correction coils 19Y assembled on the −Y side and the +Y side respectively.

When the X side correction coils 19X are electrified, the X side correction coils 19X generate the Lorentz force in the X-axis direction, and the magnets 15 generate counteracting force, so that the focusing unit 11 swings in the X-axis direction. When the Y side correction coils 19Y are electrified, the Y side correction coils 19Y generate the Lorentz force in the Y-axis direction, and the magnets 15 generate counteracting force, so that the focusing unit 11 swings in the Y-axis direction.

The swing supporting mechanism 20 includes four linear spring members 20A extending along the Z axis direction. Each side wall of the magnet support 16 defines an avoidance groove 16e formed in its central part and run through the side wall along the Z axis direction. Each linear spring members 20A passes through a corresponding one of the avoidance groove 16e between two magnets 15 without contact with the two magnets 15 assembled at the corners of the magnet support 16. The front side end part 20a of each spring member 20A is connected with the central part of each side of the outer side maintaining part 17d of the front side spring member 17A, and the rear side end part 20b of each spring member 20A is connected with the center of a corresponding one of the four sides of the base station 23. And then, the spring members 20A are used for supporting the focusing unit 11 to be capable of swinging in the X-axis direction and the Y-axis direction.

Thus, the spring members 20 as a swing supporting mechanism 20 are mounted near/in the center part of each side wall of the magnet support 16, and thus the possibility of interference between the swing supporting mechanism 20 and other members in the lens driving device 10 is reduced, and the members are easily assembled. Moreover, the focusing unit 11 can stably and straightly swing in the X-axis direction and the Y-axis direction respectively, and thus magnetic induction intensity detection can be stably carried out on the magnetic force detection mechanisms 21.

The magnetic force detection mechanisms 21 are maintained on the sensor support parts 23a arranged on the base station 23, located on the outer side of the magnets 15, and face the short base side surface of the magnets 15 with an interval therebetween in the X-axis direction and the Y-axis direction. The magnetic force detection mechanisms 21 include Hall elements or MR (magnetoresistance) elements, and include two X direction magnetic force detection mechanisms 21X assembled in the Y-axis direction and two Y direction magnetic force detection mechanisms 21Y assembled in the X-axis direction.

As shown in FIG. 2B, the X direction magnetic force detection mechanisms 21X have detection sensitivity for X-axis direction components of magnetic induction intensity, and include a first X direction magnetic force detection mechanism 21XP mounted on the +Y side and a second X direction magnetic force detection mechanism 21XM mounted on the −Y side. The Y direction magnetic force detection mechanisms 21Y have detection sensitivity for Y-axis direction components of magnetic induction intensity, and include a first Y direction magnetic force detection mechanism 21YP mounted on the +X side and a second Y direction magnetic force detection mechanism 21YM mounted on the −X side.

For example, as shown in FIG. 2A, for the magnet 15 assembled on the +Y side, the first X direction magnetic force detection mechanism 21XP mounted on the +Y side has detection sensitivity for the X-axis direction components of the magnetic induction intensity generated by the magnet 15. And then, as shown in FIG. 2B, the X direction magnetic force detection mechanisms 21X and the Y direction magnetic force detection mechanisms 21Y are symmetrically mounted by taking the center axis M (optical axis, Z axis) as reference. When a tangential direction (right spiral direction), rotating rightwards around the +Z axis, of the center axis M is taken as a +U direction, the magnetic induction intensity in the +U direction is taken as a positive value for detection. Thus, the X direction magnetic force detection mechanisms 21X can detect the X-axis direction components of the magnetic induction intensity generated by the magnets 15. The Y direction magnetic force detection mechanisms 21Y can detect the Y-axis direction components of the magnetic induction intensity generated by the magnets 15.

As shown in FIG. 1B and FIG. 2A, each magnet yoke 22 is approximately formed to be L-shaped, and there are eight magnet yokes in the embodiment. The eight magnet yokes 22 are divided into four groups, and each group has two magnet yokes 22. Each group of two magnet yokes 22 is fixed near the middle of the outer side surfaces (side surfaces that are parallel to the Z axis and are defined by the two legs of the isosceles trapezoids and edges connecting the two legs) of a corresponding one of the magnets 15, and the magnet yokes 22 extend parallel with the legs of the isosceles trapezoids. One end of each of the two pairs of magnet yokes 22 is separated from and arranged opposite to the first X direction magnetic force detection mechanisms 21XP and the second X direction magnetic force detection mechanism 21XM at intervals in the X-axis direction, and one end of the other two pairs of magnet yokes 22 are separated from and arranged opposite to the first Y direction magnetic force detection mechanism 21YP and the second Y direction magnetic force detection mechanism 21YM at intervals in the Y-axis direction. The other ends of the eight magnet yokes 22 are mounted in mounting grooves 16g formed in the side walls of the magnet support 16, and the above one end of each of the magnet yokes stretches out of the mounting groove and is opposite to the corresponding magnetic force detection mechanisms.

As a result, the X direction magnetic force detection mechanisms 21X can detect the magnetic induction intensity change occurring along with the swinging of the magnets 15 in the X-axis direction. Moreover, the Y direction magnetic force detection mechanisms 21Y can detect the magnetic induction intensity change occurring along with the swinging of the magnets 15 in the Y-axis direction.

Figure 3A:
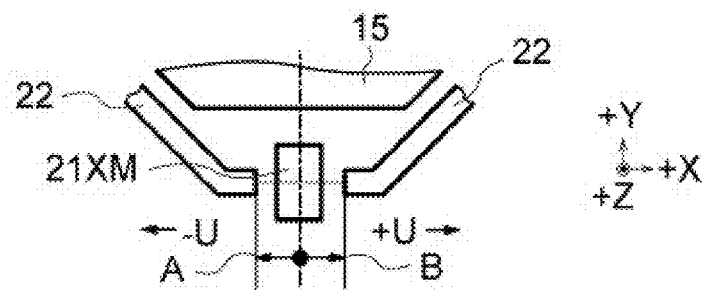
FIG. 3A is a top plane view of the main part of the lens driving device in FIG. 2A.
Figure 3B:
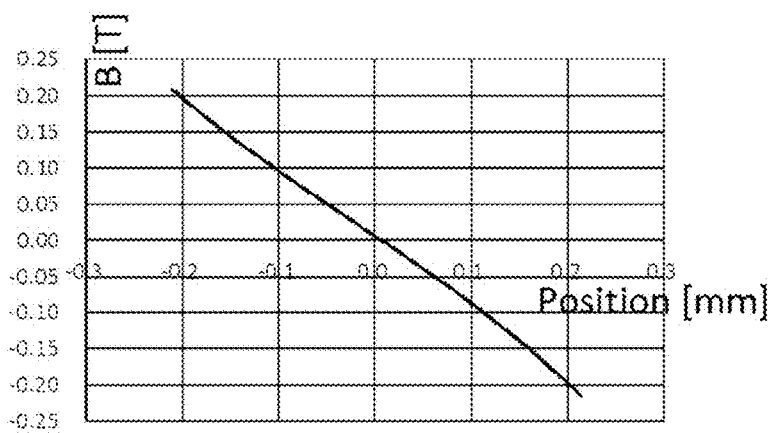
FIG. 3B is a diagram illustrating a magnetic induction intensity distribution on the main part in FIG. 3A.

In FIG. 3B, the magnetic induction intensity in the X-axis direction detected between the point A and the point B (from −U side to +U side) penetrating through the center of the second X direction magnetic force detection mechanism 21XM assembled on the −Y side of the magnet 15 as shown in FIG. 3A is illustrated.

As shown in the diagram, the magnetic induction intensity with good linearity and a suitable value corresponding to the position between the point A and the point B can be obtained, and the positions of the magnets 15, even the position of the focusing unit 11, can be suitably detected. Moreover, the interval between the magnetic force detection mechanisms 21 and the correction coils 19 is large, and a part of the magnet is set between the magnetic force detection mechanisms 21 and the correction coils 19, thus electromagnetic noise generated along with the electrification of the correction coils 19 cannot leak in the magnetic force detection mechanisms 21. Furthermore, the correction coils 19 need not to be cut, and thus the reduction of the swing driving force cannot be caused.

Therefore, the X direction magnetic force detection mechanisms 21X can accurately detect the swing position of the magnet support 16 along the X direction, and the Y direction magnetic force detection mechanisms 21Y can accurately detect the swing position of the magnet support 16 along the Y direction.

By the way, when the correction coils 19 are electrified to swing the focusing unit 11, under micro offset condition of the balance for the gravity of the focusing unit 11 or the thrust of the correction coils 19, the four spring members 20A forming the swing supporting mechanism 20 are twisted sometimes, and the magnet support 16 may generate rotational vibration. Under the condition, U direction (+U direction or −U direction) magnetic induction intensity respectively applied onto the first X direction magnetic force detection mechanism 21XP and the second X direction magnetic force detection mechanism 21XM as well as the first Y direction magnetic force detection mechanism 21YP and the second Y direction magnetic force detection mechanism 21YM changes at the same time, and unnecessary electromagnetic noise generated along with the rotational vibration can be got by the first X direction magnetic force detection mechanism 21XP and the second X direction magnetic force detection mechanism 21XM as well as the first Y direction magnetic force detection mechanism 21YP and the second Y direction magnetic force detection mechanism 21YM.

Figure 3C:
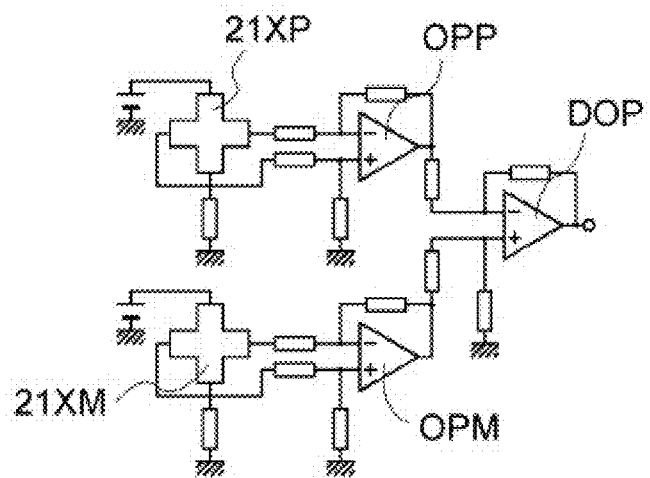
FIG. 3C is a schematic circuit diagram of a detection circuit in accordance with a first embodiment of the present invention.

Relatively, in a detection circuit as shown in FIG. 3C, the detection circuit can apply differential operation to the detection output of the first X direction magnetic force detection mechanism 21XP and the second X direction magnetic force detection mechanism 21XM mounted at opposite corners, and thus the detected electromagnetic noise can be cancelled in the X direction magnetic force detection mechanism 21X.

As a specific detection circuit example, an amplifier OPP is used for amplifying the detection output of the first X direction magnetic force detection mechanism 21XP, an amplifier OPM is used for amplifying the detection output of the second X direction magnetic force detection mechanism 21XM, and a differential amplifier DOP is used for carrying out differential motion on the outputs of the amplifiers OPP, OPM. Thus, if the differential motion is carried out on the detection output of the first X direction magnetic force detection mechanism 21XP and the detection output of the second X direction magnetic force detection mechanism 21XM, changes of the magnetic induction intensity generated based on the rotation in the U direction are cancelled, and the changes of the magnetic induction intensity of the magnets 15, namely the position signals in the X-axis direction, along with the swing of the magnet support 16 in the X-axis direction can be detected. Similarly, the differential motion is applied to the detection outputs of the first Y direction magnetic force detection mechanism 21YP and the second Y direction magnetic force detection mechanism 21YM mounted at the opposite corners respectively, and the detected electromagnetic noise can be cancelled in the Y direction magnetic force detection mechanisms 21Y. Thus, the position detection precision in the X-axis direction and the Y-axis direction can be improved.

Moreover, the first X direction magnetic force detection mechanism 21XP and the second X direction magnetic force detection mechanism 21XM as well as the first Y direction magnetic force detection mechanism 21YP and the second Y direction magnetic force detection mechanism 21YM in the embodiment are provided in a rotational symmetric manner so that the +U direction (tangential direction rotating rightwards around the +Z-axis direction) can be taken as a positive induction direction. However, in other embodiments, the first X direction magnetic force detection mechanism 21XP may be mounted in a manner of taking the +X direction (−U direction) as the positive induction direction, and the second X direction magnetic force detection mechanism 21XM is mounted, in the manner of taking the +X direction (+U direction) as the positive induction direction, symmetrical to the first X direction magnetic force detection mechanism 21XP. Under this condition, the differential motion of the detection circuit becomes into superposition, and the electromagnetic noise can also be cancelled. And then, the signal superposition with opposite polarities of detection sensitivity can also be the same as the signal differential motion with same polarity of detection sensitivity.

Moreover, in other embodiments, the four magnetic force detection mechanisms 21, that is the first X direction magnetic force detection mechanism 21XP, the second X direction magnetic force detection mechanism 21XM, the first Y direction magnetic force detection mechanism 21YP and the second Y direction magnetic force detection mechanism 21YM, do not need to be mounted completely, in order to simplify the structure and reduce the cost, only one of the first X direction magnetic force detection mechanism 21XP and the second X direction magnetic force detection mechanism 21XM may be mounted, and only one of the first Y direction magnetic force detection mechanism 21YP and the second Y direction magnetic force detection mechanism 21YM may be mounted. Moreover, the dimensions of the short bases, with cross-section shapes observed from the Z-axis direction, of the isosceles trapezoid-shaped magnets 15 can also be reduced, so that the cross-section shapes are substantially formed to be isosceles triangles. And then, the magnet yokes 22 as shown in FIG. 3A are not limited to the shape that can extend from the long bases of the magnets 15 towards the short bases of the magnets 15, and can be deformed variously, for example, the magnet yokes 22 can be very short and only arranged on two sides of the magnetic force detection mechanisms 21.

Above, when hand shaking occurs during shooting, the X side correction coils 19X and the Y side correction coils 19Y are electrified, the focusing unit 11 swings in the X-axis direction and the Y-axis direction, the swing amplitude is monitored at high precision by the X direction magnetic force detection mechanisms 21X and the Y direction magnetic force detection mechanisms 21Y, and hand shake correction is suitably carried out.

Figure 4A:
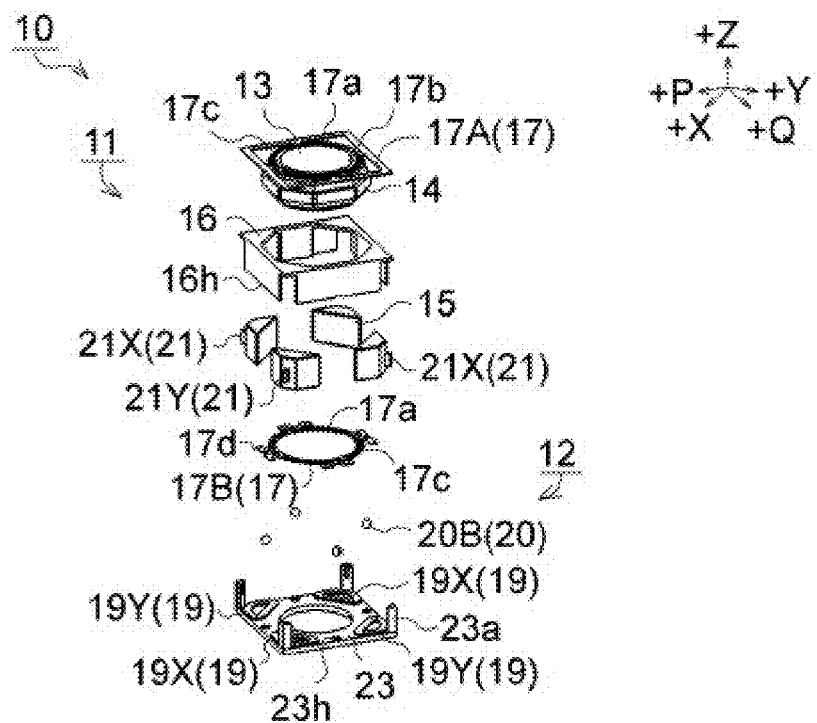
FIG. 4A is an explosive view of a lens driving device with shaking correction function in accordance with a second embodiment of the present invention.
Figure 4B:
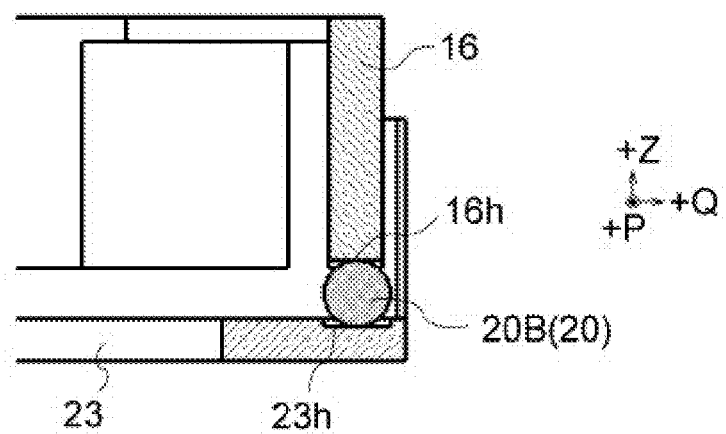
FIG. 4B is a cross-sectional view of a main part of the lens driving device in the second embodiment of the present invention.

FIG. 4A is an explosive view of a lens driving device 10 in a second embodiment, and FIG. 4B is a sectional view of the main part of the lens driving device 10 in the second embodiment.

The differences between the lens driving device 10 in the second embodiment and the lens driving device 10 in the first embodiment lie in that the structures of the swing supporting mechanisms 20 are different and the magnet yokes 22 are canceled.

The focusing unit 11 includes the lens support 13, a focus coil 14, magnets 15, a magnet support 16 and a suspension supporting mechanism 17 including platelike spring members. The hand shake correcting unit 12 includes correction coils 19, a swing supporting mechanism 20 composed of linear spring members 20B, magnetic force detection mechanisms 21 and a base station 23.

The lens support 13 is an octagonal cylindrical member with an opening along the Z-axis direction in the central part, and the unshown lens is maintained on the inner peripheral side of the lens support 13. The focus coil 14 is wound into an octagonal ring shape along the outer surface of the lens support 13.

The magnet support 16 is a square frame-shaped member with an opening along the Z-axis direction, and the four corners of the magnet support 16 face the X-axis direction and the Y-axis direction when being observed in the Z-axis direction.

When being observed from the Z-axis direction, the cross-section shapes of the magnets 15 are isosceles trapezoid. Each magnet 15 is magnetized between its short base and the long base (the parallel sides) (namely, the magnetization direction is from the short base to the long base or conversely). The magnetic pole faces on the long base side of the magnets 15 face the center of the magnet support 16, and the four magnets 15 are arranged on the outer diameter side of the focus coil 14 at 90-degree intervals around the axis parallel to the Z axis. And then, the magnets 15 are separated from and arranged opposite to the focus coil 14 at intervals along the X-axis direction and the Y-axis direction. Thus, the magnets 15 are maintained at four corners in the diagonal direction of the magnet support 16 when being observed in the Z-axis direction.

The suspension supporting mechanism 17 includes a front side spring member 17A and a rear side spring member 17B. Circular ring-shaped inner side maintaining parts 17a of the front side spring member 17A and the rear side spring member 17B are connected with the +Z side end surface and the −Z side end surface of the lens support 13 respectively. Moreover, the square ring-shaped outer side maintaining part 17b of the front side spring member 17A is connected with the +Z side end surface of the magnet support 16. The four oblong outer side maintaining parts 17d of the rear side spring member 17B are connected with the −Z side end surface of the magnet support 16. The wrist parts 17c of the front side spring member 17 are taken as springs for connecting the inner side maintaining part 17a with the outer side maintaining part 17b to take effect. The wrist parts 17c of the rear side spring member 17B are taken as springs for connecting the inner side maintaining part 17a with the outer side maintaining parts 17b to take effect. Thus, the suspension supporting mechanism 17 is used for supporting the lens support 13 in a suspension manner to be moved in the Z-axis direction.

When the focus coil 14 of the focusing unit 11 formed as mentioned above is electrified, the focus coil 14 generates Lorentz force in the Z-axis direction, and the lens support 13 moves in the Z-axis direction.

The base station 23 includes a square plate defining an opening in the Z-axis direction in the central part, and the square plate takes the X-axis direction and the Y-axis direction as its diagonal directions, and four sensor support parts 23a extend along the Z-axis direction from the four corners of the square plate of the base station 23. Each sensor support part 23a corresponds to one of the magnets 15, and is arranged on the outer side of the corresponding magnets in the X-axis direction or in Y-axis direction so as to maintain a corresponding one of the magnetic force detection mechanisms 21. The correction coils 19 are mounted on the +Z side surface of the base station 23 positioned on the −Z side of the magnets 15.

Each correction coil 19 is wound around an axis parallel to the Z axis, and is separated from and arranged opposite to the −Z side surfaces of a corresponding one of the magnets 15 at intervals along the Z-axis direction. The correction coils 19 include two X side correction coils 19X assembled on the −X side and the +X side respectively and two Y side correction coils 19Y assembled on the −Y side and the +Y side respectively.

When the X side correction coils 19X are electrified, the X side correction coils 19X generate the Lorentz force in the X-axis direction, and the magnets 15 generate counteracting force, so that the focusing unit 11 swings in the X-axis direction. When the Y side correction coils 19Y are electrified, the Y side correction coils 19Y generate the Lorentz force in the Y-axis direction, and the magnets 15 generate counteracting force, so that the focusing unit 11 swings in the Y-axis direction.

In the embodiment, the swing supporting mechanism 20 includes four rotating members 20B composed of ball bodies. Each rotating member 20B is configured between two adjacent magnets 15 at equal intervals. The −Z side edge of each side wall of the magnet support 16 formed on the side of the focusing unit 11 defines a maintaining hole/notch 16h in the middle part. The +Z side surface of the base station 23 formed on the side of the hand shake correcting unit 12 defines maintaining holes 23h corresponding to the maintaining hole/notch 16h. The rotating members 20B are clamped along the Z-axis direction within the maintaining holes/notches 16h and the maintaining holes 23h. The rotating members 20b roll in the maintaining holes 23h of the base station so that the focusing unit 11 supported by the rotating members 20B is supported to be capable of swing in the X-axis direction and the Y-axis direction respectively. Thus, the rotating members 2B are set between the magnets 15 near the central part of the −Z side edge of each side wall of the magnet support 16, so that the possibility of interference with other members of the lens driving device 10 can be reduced, the assembling is easier. Moreover, the focusing unit 11 can stably and straightly swing in the X-axis direction and the Y-axis direction respectively, and thus the detection of the magnetic force detection mechanisms 21 for magnetic induction intensity becomes stable.

The magnetic force detection mechanisms 21 are maintained on the sensor support parts 23a arranged on the base station 23, located on the outer side of the magnets 15, and face the short base side surface of the magnets 15 with an interval therebetween in the X-axis direction and the Y-axis direction. The magnetic force detection mechanisms 21 are formed by Hall elements or MR elements, and include two X direction magnetic force detection mechanisms 21X assembled in the Y-axis direction and two Y direction magnetic force detection mechanisms 21Y assembled in the X-axis direction.

The X direction magnetic force detection mechanisms 21X have detection sensitivity for the X-axis direction components of the magnetic induction intensity, and the Y direction magnetic force detection mechanisms 21Y have detection sensitivity for the Y-axis direction components of the magnetic induction intensity. As a result, the X direction magnetic force detection mechanisms 21X can detect the magnetic induction intensity change occurring along with the swinging of the magnets 15 in the X-axis direction at high precision. Moreover, the Y direction magnetic force detection mechanisms 21Y can detect the magnetic induction intensity change occurring along with the swinging of the magnets 15 in the Y-axis direction at high precision.

Moreover, the second embodiment is also similar to the first embodiment, the X direction magnetic force detection mechanisms 21X or the Y direction magnetic force detection mechanisms can be mounted at the four corners in pairs, and can also be just mounted on the single side of the diagonal positions.

In the embodiment, similar to that in the first embodiment, the detection circuit as shown in FIG. 3C is adopted so as to cancel the electromagnetic noise which can be detected by the magnetic force detection mechanisms.

To sum up, when hand shaking occurs during shooting, the X side correction coils 19X and the Y side correction coils 19Y are electrified, the focusing unit 11 swings in the X-axis direction and the Y-axis direction accordingly, the swing amplitude is monitored at high precision by the X direction magnetic force detection mechanisms 21X and the Y direction magnetic force detection mechanisms 21Y, and hand shake correction is suitably carried out.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:
1. A lens driving device with a shaking correction function, configured for driving a lens or a lens assembly, an optical axis of the lens or the lens assembly is taken as a Z-axis and two mutually orthogonal axes which are orthogonal with the Z-axis are taken as an X-axis and a Y-axis respectively, the lens driving device comprising:
  a focusing unit, comprising:
    a lens support configured for maintaining the lens or the lens assembly;
    a focus coil wound around the Z-axis direction and sleeved on the lens support;
    a magnet support;
    a plurality of magnets received in the magnet support and configured opposite to the focus coil with an interval in a radial direction of the lens or the lens assembly; and
    a suspension supporting mechanism connected between the lens support and the magnet support and configured for supporting the lens support to move in the Z-axis direction; and
  a hand shake correcting unit, comprising:
    a base station;
    a plurality of magnetic force detection mechanisms mounted on the base station;
    a plurality of correction coils each of which is wound around an axis parallel to the Z-axis and is configured opposite to a corresponding one of the plurality of magnets with an interval along the Z-axis direction; and
    a swing supporting mechanism connected between the base station and the focusing unit and configured for supporting the focusing unit to swing in directions orthogonal with the Z-axis;
  wherein when being observed in the Z-axis direction, each magnet is an isosceles trapezoid with its long base facing a center of the magnet support, the magnet support is substantially a square frame body, four corners of the frame body are positioned in the X-axis direction and the Y-axis direction respectively, and the magnets are mounted at the four corners of the magnet support;

wherein the plurality of magnetic force detection mechanisms comprise:

one or two X-direction magnetic force detection mechanisms having detection sensitivity for X-axis direction components of magnetic induction intensity and mounted in the Y-axis direction, and each being configured on an outer side of a corresponding one of the plurality of magnets in the radial direction of the lens or the lens assembly; and one or two Y-direction magnetic force detection mechanisms having detection sensitivity for Y-axis direction components of magnetic induction intensity and mounted in the X-axis direction, and each being configured on an outer side of a corresponding one of the plurality of magnets in a radial direction of the lens or the lens assembly;

wherein the lens driving device further comprises:

a first pair of magnet yokes whose one ends are separated from and arranged opposite to the X-direction magnetic force detection mechanisms at intervals on two sides in the X-axis direction of the X-direction magnetic force detection mechanisms; and a second pair of magnet yokes whose one ends are separated from and arranged opposite to the Y-direction magnetic force detection mechanisms at intervals on two sides in the Y-axis direction of the Y-direction magnetic force detection mechanisms.

2. The lens driving device according to claim 1, wherein the swing supporting mechanism comprises a plurality of linear spring members extending along the Z-axis direction; every two adjacent magnets corresponds to one of the plurality of linear spring members, and the one of the plurality of linear spring members is configured between the two adjacent magnets; one end of each linear spring member is connected with the hand shake correcting unit, and the other end is connected with the focusing unit.

3. The lens driving device according to claim 1, wherein the swing supporting mechanism comprises a plurality of rotatable rotating members; every two adjacent magnets correspond to one of the plurality of rotating members, and the one of the plurality of rotating members is configured between the two adjacent magnets; and the plurality of rotatable rotating members are clamped between the focusing unit and the hand shake correcting unit along the Z-axis direction.

4. The lens driving device according to claim 1, wherein there are two X-direction magnetic force detection mechanisms symmetrically mounted in the Y-axis direction and two Y-direction magnetic force detection mechanisms symmetrically mounted in the X-axis direction, the lens driving device further comprises:

a first detection circuit connected to output ends of the two X-direction magnetic force detection mechanisms; and a second detection circuit connected to output ends of the two Y-direction magnetic force detection mechanisms;

wherein each of the first and the second detection circuits comprises a differential processing circuit used for carrying out differential processing on output signals received from the output ends.

5. The lens driving device according to claim 4, wherein the swing supporting mechanism comprises a plurality of linear spring members extending along the Z-axis direction; every two adjacent magnets corresponds to one of the plurality of linear spring members, and the one of the plurality of linear spring members is configured between the two adjacent magnets; one end of each linear spring member is connected with the hand shake correcting unit, and the other end is connected with the focusing unit.

6. The lens driving device according to claim 4, wherein the swing supporting mechanism comprises a plurality of rotatable rotating members; every two adjacent magnets correspond to one of the plurality of rotating members, and the one of the plurality of rotating members is configured between the two adjacent magnets; and the plurality of rotatable rotating members are clamped between the focusing unit and the hand shake correcting unit along the Z-axis direction.

7. The lens driving device according to claim 1, wherein there are two X-direction magnetic force detection mechanisms symmetrically mounted in the Y-axis direction and two Y-direction magnetic force detection mechanisms symmetrically mounted in the X-axis direction, the lens driving device further comprises:

a first detection circuit connected to output ends of the two X-direction magnetic force detection mechanisms; and a second detection circuit connected to output ends of the two Y-direction magnetic force detection mechanisms;

wherein each of the first and the second detection circuits comprises a differential processing circuit used for carrying out differential processing on output signals received from the output ends.

8. The lens driving device according to claim 7, wherein the swing supporting mechanism comprises a plurality of linear spring members extending along the Z-axis direction; every two adjacent magnets corresponds to one of the plurality of linear spring members, and the one of the plurality of linear spring members is configured between the two adjacent magnets; one end of each linear spring member is connected with the hand shake correcting unit, and the other end is connected with the focusing unit.

9. The lens driving device according to claim 7, wherein the swing supporting mechanism comprises a plurality of rotatable rotating members; every two adjacent magnets correspond to one of the plurality of rotating members, and the one of the plurality of rotating members is configured between the two adjacent magnets; and the plurality of rotatable rotating members are clamped between the focusing unit and the hand shake correcting unit along the Z-axis direction.

10. A lens driving device with a shaking correction function, configured for driving a lens or a lens assembly, an optical axis of the lens or the lens assembly is taken as a Z-axis and two mutually orthogonal axes which are orthogonal with the Z-axis are taken as an X-axis and a Y-axis respectively, the lens driving device comprising:

a focusing unit, comprising:

a lens support for maintaining the lens or the lens assembly;

a focus coil which is wound around the Z-axis direction and is mounted on an outer side of the lens support;

a plurality of magnets which are separated from and arranged opposite to the focus coil at intervals in a radial direction of the lens or the lens assembly;

a magnet support for maintaining the magnets; and a suspension supporting mechanism connected between the lens support and the magnet support, extending along the X-axis direction and the Y-axis direction and configured for supporting the lens support to move in the Z-axis direction; and a hand shake correcting unit, comprising:

a base station;

a magnetic force detection mechanism mounted on the base station;

a plurality of correction coils each of which is wound around an axis parallel to the Z-axis and is separated from and arranged opposite to a corresponding one of the plurality of magnets at an interval along the Z-axis direction; and a swing supporting mechanism connected between the base station and the focusing unit and configured for supporting the focusing unit to swing in directions orthogonal with the Z-axis;

wherein the magnet support is substantially a square frame body when being observed in the Z-axis direction, opposite angles of the frame body are positioned in the X-axis direction and the Y-axis direction respectively, each magnet is formed to be a cylinder in an isosceles trapezoid shape when being observed in the Z-axis direction, and the magnets are mounted at opposite angle directions of the magnet support in a manner that long bases of the isosceles trapezoid shape cylinder face a center of the magnet support;

wherein the magnetic force detection mechanisms comprise one or two X-direction magnetic force detection mechanisms and one or two Y-direction magnetic force detection mechanisms, wherein the one or two X-direction magnetic force detection mechanisms have detection sensitivity for X-axis direction components of magnetic induction intensity of one or two corresponding magnets which are mounted in the Y-axis direction;

wherein the one or two Y-direction magnetic force detection mechanisms have detection sensitivity for Y-axis direction components of magnetic induction intensity of one or two corresponding magnets which are mounted in the X-axis direction;

wherein each X-direction magnetic force detection mechanism is configured on an outer side of the corresponding one of the plurality of magnets in the radial direction of the lens or the lens assembly, and each Y-direction magnetic force detection mechanism is configured on an outer side of the corresponding one of the plurality of magnets in a radial direction of the lens or the lens assembly;

wherein the lens driving device further comprising:

a first pair of magnet yokes whose one ends are separated from and arranged opposite to the X-direction magnetic force detection mechanisms at intervals on two sides in the X-axis direction of the X-direction magnetic force detection mechanisms; and a second pair of magnet yokes whose one ends are separated from and arranged opposite to the Y-direction magnetic force detection mechanisms at intervals on two sides in the Y-axis direction of the Y-direction magnetic force detection mechanisms.

11. The lens driving device according to claim 10, wherein the swing supporting mechanism comprises a plurality of linear spring members extending along the Z-axis direction; every two adjacent magnets corresponds to one of the plurality of linear spring members, and the one of the plurality of linear spring members is configured between the two adjacent magnets; one end of each linear spring member is connected with the hand shake correcting unit, and the other end is connected with the focusing unit.

12. The lens driving device according to claim 10, wherein the swing supporting mechanism comprises a plurality of rotatable rotating members; every two adjacent magnets correspond to one of the plurality of rotating members, and the one of the plurality of rotating members is configured between the two adjacent magnets; and the plurality of rotatable rotating members are clamped between the focusing unit and the hand shake correcting unit along the Z-axis direction.

13. The lens driving device according to claim 10, wherein there are two X-direction magnetic force detection mechanisms symmetrically mounted in the Y-axis direction and two Y-direction magnetic force detection mechanisms symmetrically mounted in the X-axis direction, the lens driving device further comprises:

a first detection circuit connected to output ends of the two X-direction magnetic force detection mechanisms; and a second detection circuit connected to output ends of the two Y-direction magnetic force detection mechanisms;

wherein each of the first and the second detection circuits comprises a differential processing circuit used for carrying out differential processing on output signals received from the output ends.

14. The lens driving device according to claim 13, wherein the swing supporting mechanism comprises a plurality of linear spring members extending along the Z-axis direction; every two adjacent magnets corresponds to one of the plurality of linear spring members, and the one of the plurality of linear spring members is configured between the two adjacent magnets; one end of each linear spring member is connected with the hand shake correcting unit, and the other end is connected with the focusing unit.

15. The lens driving device according to claim 13, wherein the swing supporting mechanism comprises a plurality of rotatable rotating members; every two adjacent magnets correspond to one of the plurality of rotating members, and the one of the plurality of rotating members is configured between the two adjacent magnets; and the plurality of rotatable rotating members are clamped between the focusing unit and the hand shake correcting unit along the Z-axis direction.

16. The lens driving device according to claim 10, wherein there are two X-direction magnetic force detection mechanisms symmetrically mounted in the Y-axis direction and two Y-direction magnetic force detection mechanisms symmetrically mounted in the X-axis direction, the lens driving device further comprises:

a first detection circuit connected to output ends of the two X-direction magnetic force detection mechanisms; and a second detection circuit connected to output ends of the two Y-direction magnetic force detection mechanisms;

wherein each of the first and the second detection circuits comprises a differential processing circuit used for carrying out differential processing on output signals received from the output ends.

17. The lens driving device according to claim 16, wherein the swing supporting mechanism comprises a plurality of linear spring members extending along the Z-axis direction; every two adjacent magnets corresponds to one of the plurality of linear spring members, and the one of the plurality of linear spring members is configured between the two adjacent magnets; one end of each linear spring member is connected with the hand shake correcting unit, and the other end is connected with the focusing unit.

18. The lens driving device according to claim 16, wherein the swing supporting mechanism comprises a plurality of rotatable rotating members; every two adjacent magnets correspond to one of the plurality of rotating members, and the one of the plurality of rotating members is configured between the two adjacent magnets; and the plurality of rotatable rotating members are clamped between the focusing unit and the hand shake correcting unit along the Z-axis direction.

* * * * *